May 29, 1928.
E. O. HUTSELL
PLOW
Filed March 29, 1922    2 Sheets-Sheet 1
1,671,427
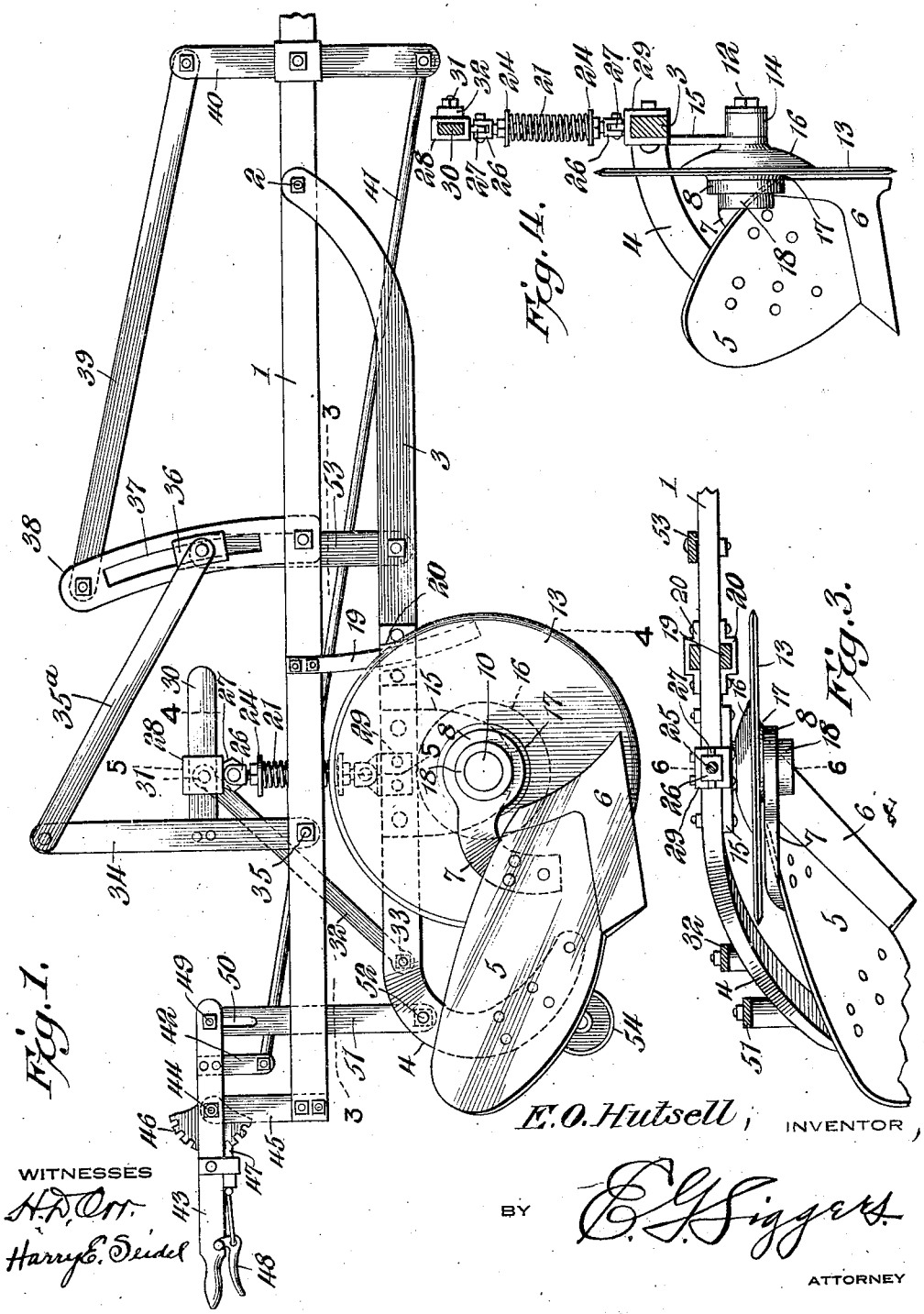
E. O. Hutsell, INVENTOR
WITNESSES
BY
ATTORNEY May 29, 1928.
E. O. HUTSELL
PLOW
Filed March 29, 1922
1,671,427
2 Sheets-Sheet 2
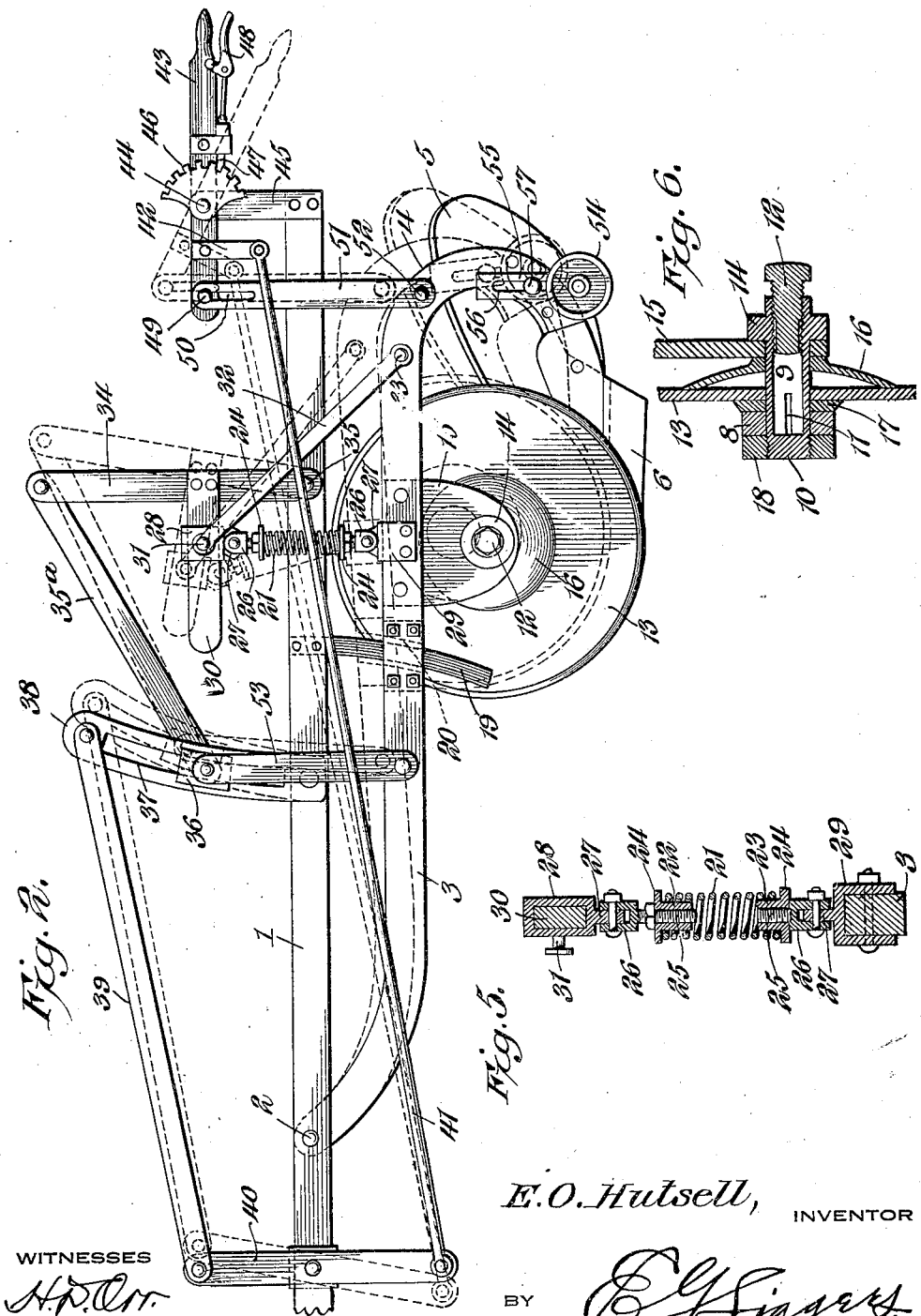
E. O. Hutsell, INVENTOR Patented May 29, 1928.

1,671,427

UNITED STATES PATENT OFFICE.

ERNEST O. HUTSELL, OF ATHENS, TENNESSEE, ASSIGNOR OF ONE-HALF TO EMMET L. DELAY, OF ATHENS, TENNESSEE.

PLOW.

Application filed March 29, 1922. Serial No. 547,795.

This invention relates to riding plows, and has for its object to provide a plow with means for lifting the plowshare from the ground when an obstruction is met with, so as to avoid injury to the plowshare, or to other parts of the plow, and which obviates the necessity of driving around such obstructions and producing irregular furrows.

Another object of the invention is to provide a manual means for lifting the plowshare from the ground, which is so constructed that it will not interfere with the lifting means.

A further object of the invention is to eliminate the landside of the plow by providing a disk which works against the share side of the moldboard, which disk extends past the bottom of the plow point and lifts the plow over any obstacle that the disk or the plow cannot cut through; and moreover, by cutting the earth with a straight disk, the friction between the landside and the earth is done away with.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a side view of the plow.

Fig. 2 is a similar view looking at the opposite side.

Fig. 3 is a horizontal section on the line 3—3, Fig. 1.

Fig. 4 is a transverse section looking rearwardly on the line 4—4, Fig. 1.

Fig. 5 is a vertical section on the line 5—5, Fig. 1, showing the means for holding the plow in the ground.

Fig. 6 is a vertical sectional view on the line 6—6 of Fig. 3.

Referring to the drawing, 1 designates a main beam, which may be connected in any suitable manner to a sulky drawn by horses, or attached to a tractor, either between the wheels or to the side of the wheels, and which is adapted for mounting a plow singly or in gangs. To the forward end of the main beam 1 is pivotally mounted, at 2, a curved supplemental beam 3, which is arranged below the main beam 1 and spaced therefrom and extends rearwardly thereof, being curved downwardly to form a standard 4, to which is secured a moldboard 5, the usual plowpoint 6 being secured in any appropriate manner to the forward end of the moldboard 5.

Secured to the inner side of the moldboard, near the plow point, and extending forwardly and above the latter, is a curved bracket 7, having a bearing 8, for the mounting of a hollow pin 9, which is closed at one end, as shown at 10, and provided with a slot 11. (Fig. 6.) The other end of the pin is open, and is internally threaded and closed by a threaded plug 12, the interior of the pin 9 being filled with grease which is forced through the slot 11 by screwing up the plug 12, whereby the hub of the disk 13 rotatably mounted on the pin 9 is lubricated. The pin passes through a hole in the bracket 15 and is provided with a fixed collar 14, bearing against said bracket which is secured by means of bolts at its upper end to the pivoted supplemental beam 3. A concave disk washer 16 is located between the bracket 15 and one side of the disk 13, and when the washer 17 and the nut 18 are drawn up tight on the threaded end 10 of the pin 9, the collar 14 of said pin is drawn up tight against the bracket 15 as shown in Fig. 6, thereby maintaining the disk in proper cutting position.

Curved guides 19, secured at their upper ends to the main beam 1, depend downwardly upon opposite sides of the pivoted supplemental beam 3, and pass through cuffs 20 secured to opposite sides of the latter in order to maintain the supplemental beam in substantial alinement with the main beam 1 when the supplemental beam is oscillated as the plow and the disk are raised, the guides 19 preventing lateral play of the beam 3 and the parts carried thereby when elevated or lowered.

The usual landside of the plow in this case is eliminated, since the disk 13 extends in advance of the plowpoint 6, and in a line with the usual position of the landside of the plow, so that the disk, being maintained in a vertical position, will not only cut through the ground, but when it strikes an obstruction in the ground will be raised to oscillate the beam 3 and likewise elevate the plow.

It will be noted that the disk is straight and extends past the bottom of the plow point and works against the latter and acts to eliminate the landside. It does not press against the moldboard.

When the beam 3 is moved on its pivot 2 towards and away from the main beam 1, it is resisted in its upward movement by the pressure of the spring 21. As shown in Fig. 5, the ends of the coil spring embrace respectively the internally threaded sleeves 22 and 23, having flanges 24 against which the ends of the spring bear. In the internally threaded portions of the sleeves 22 and 23 are screwed adjusting bolts 25, whereby the tension on the spring may be increased or diminished. The outer ends of the adjusting bolts are provided with ears 26, into which are pivotally mounted the projecting ears 27 of upper and lower cuffs 28 and 29, respectively. The cuff 28 is slidably mounted on an arm 30, while the cuff 29 is rigidly secured to the beam 3. A headed journal pin 31 projects outwardly from one side of the cuff 28, upon which is pivotally mounted one end of a link 32, the other end having connection at 33 with the rear end of the beam 3.

The arm 30 is rigidly connected at its inner end to an oscillating lever or movable support 34, which is pivotally mounted at 35 on the main beam 1. The upper end of the said lever 34 is connected by means of a link 35$^a$ to a cross-head 36, which is slidable in a slot 37 formed in an oscillating link 38 pivotally mounted at its lower end to the main beam 1. The upper end of the oscillating link 38 is connected by means of a link 39, to an oscillating lever 40, which is pivoted intermediate its ends on the front end of the main beam 1. The lower end of the oscillating lever 40 is connected by means of a rod 41 to an arm 42, rigidly secured to and depending down from a manually operable lever 43, which is pivoted at 44 to the upper ends of brackets 45, rigidly secured to the rear end of the main beam 1.

Rigidly mounted on the bracket 45 is a rack 46, the teeth of which are adapted to be engaged by a pawl 47, operated by hand lever 48, which is pivotally mounted on the manually operable lever 43, for maintaining the lever 43 in any one of a plurality of positions.

A pin 49 is rigidly mounted on the inner end of the lever 43, and rides in a slot 50, formed at the upper end of a link 51, the lower end of said link being pivotally connected at 52 to the rear end of the supplemental beam 3.

A link 53 is pivotally connected at its upper end to the cross-head 36, and at its lower end to the supplemental beam 3.

A gage wheel 54 is adjustably connected to the rear end of the supplemental beam 3 by means of a bracket 55, provided with a slot 56, in which is movable a bolt 57 provided with a nut for locking the bracket 55 on the free end of the beam 3. The gage wheel 54 operates to regulate the depth of plowing, and also serves as a means for balancing and holding the plow in proper position.

By the mounting of the disk 13, the latter will always be maintained in a vertical position, and in spaced relation with the moldboard of the plow, but will fit sufficiently close to the plowpoint to cut the ground in advance of the latter.

The operation of my device is as follows:—

The spring 21, by reason of its connection with the arm 30 and the pivoted beam 3, will be under a certain tension and thereby normally force the plow 5, 6 and the disk 13 into the ground, and maintain them in operative position when plowing. If at any time the disk meets with an obstruction in the ground, it will be forced upwardly, carrying with it the plow and the beam 3 against the tension of the spring 21. As the beam 3 is raised, the lower end of the link 32 will also be raised, and this will force the upper end of said link forwardly and slide the cuff 28 along the arm 30. As the supplemental beam 3 is raised, the link 53 will likewise be raised, and will move the cross-head 36 upwardly within the slot 37 of the link 38. When the crosshead 36 is raised, the inner end of the link 35$^a$ will be lifted and moved slightly rearwardly. This will swing the upper end of lever 34 slightly rearwardly, swinging the arm 30 slightly upwardly about the point 35 as a center, and will consequently raise the cuff 28 slightly. Inasmuch as the cuff 29 is raised almost the same distance as the pivotal point 33, if the link 32 were moved upwardly by a parallel motion, the tension of the spring would remain substantially the same and there would be no definite position of equilibrium, but the upper end of the link 32 is moved laterally along with the cuff 28 to compensate in part for the upward movement of the lower end of the link. Likewise, the upward movement of the upper end of the spring 21, as well as the upper end of the link 32, will be appreciably less than the upward movement of the lower end of the spring, and the consequent compression of the spring will have a tendency to restore the parts to their normal position of equilibrium, as soon as the obstruction is passed. The relatively small displacement of the spring will permit a comparatively wide range of movement of the supplemental beam 3, and will also reduce the amount of power necessary to effect its movement. When the supplemental beam 3 is moved by the disk meeting an obstruction in the ground, link 51 will be raised, but since the pin 49 rides in the slot 50 of said link and provides a lost motion connection, the automatic elevation of the beam 3 will not affect the lever 43.

If at any time, the plow should meet with such an obstruction that there would be danger of injuring the plow and its parts, or when it is desired to plow to a less depth, the outer free end of the lever 43 may be depressed, as shown in dotted lines in Figure 2. This in addition to positively raising the plow 5, 6, the disk 13 and supplemental beam 3, rocks the lever 40, as shown in dotted lines in Figure 2, rocks the link 38 rearwardly and raises the arm 30 considerably more than when the supplemental beam 3 is automatically raised by passing over an obstruction, without changing the position of lever 43. Thus, by adjusting the lever 43, the supplemental beam 3 and the plow may be raised relatively to the beam 1 without appreciably changing the tension of the spring 21, and consequently without requiring the expenditure of any force more than that necessary to overcome the weight of the parts adjusted.

The disk and plow may be connected to the main beam 1, by means of the beam 3, as described above, when used in any size of the common one-horse turning plow, which is adapted to be drawn by a horse, and provided with handles attached to beam 3 behind the moldboard 5 by means of an extension bolt. The manually operated holding down device would be eliminated in this type of plow.

What is claimed is:—

1. In a plow, the combination with a frame and a beam swingably mounted thereon, of earth working elements carried by the beam, said frame including a swingably mounted arm above the beam, a cuff slidably mounted on said arm, a resilient connection between the beam and cuff, and a link connection between said beam and said cuff.

2. In a plow, the combination with a frame and a beam connected in vertically swinging relation thereto, of earth working elements carried by the beam, resilient means between a part of the frame and the beam for normally holding the latter down, and a connection between the beam and said resilient means to tilt the latter forwardly when the beam is raised.

3. In a plow, the combination with a frame including a main beam, of a supplemental beam pivoted to the main beam to swing vertically, earth working elements carried by the supplemental beam, spring means between the frame and the supplemental beam tending to hold the latter down, means connecting the supplemental beam with the spring means to tilt the latter longitudinally as the supplemental beam is raised, a hand operated lever mounted on the main frame, and means connecting the supplemental beam to the hand lever, the last-mentioned means having a lost motion connection, whereby the supplemental beam may rise without affecting the hand lever.

4. In a plow, the combination with a frame including a main beam, of a supplemental beam pivoted to the main frame, earth working elements carried by the supplemental beam, resilient means having a longitudinally slidable connection with the main frame above the supplemental beam and bearing against the latter, and means connecting the supplemental beam with the longitudinally slidable connection to move the latter forwardly when the supplemental beam is raised.

5. In a plow, the combination with a frame including a main beam, of a supplemental beam pivoted to the main frame, earth working elements carried by the supplemental beam, a compression spring against the supplemental beam and tending to hold it down, an arm pivoted on the frame to swing in a vertical plane, means longitudinally slidable on said arm for supporting the spring means above the supplemental beam, a connection between the supplemental beam and said longitudinally slidable means to move the latter forwardly when the supplemental beam is raised, and an independent connection between the supplemental beam and said arm to swing the latter about its pivot as the supplemental beam is lifted.

6. In a plow, the combination with a frame including a main beam, of a supplemental beam pivoted thereto, earth working elements carried by the supplemental beam, a support pivoted to the main beam to swing in a vertical plane, resilient means slidably mounted at the upper end on said support and at its lower end connected to the supplemental beam, a connection between the supplemental beam and the upper end of the resilient means, and a link connection between the supplemental beam and the pivoted support to tilt the latter as the supplemental beam rises.

7. In a plow, a frame including a main beam, a supplemental beam pivoted to the main beam, a plow and disk mounted on the supplemental beam, a spring acting between the frame and the supplemental beam to resiliently depress the latter, a lifting lever, and means for reducing the increase in the tension of the spring as the plow is raised.

8. In a plow, a frame including a main beam, a supplemental beam pivoted to the main beam, a plow mounted on the supplemental beam, resilient means acting between the frame and the supplemental beam for normally pressing the latter downwardly and thereby forcing the plow into the ground, a disk arranged in advance of the plow for causing the latter to be raised out of the ground when said disk meets with an obstruction, a lifting lever, and means for reducing the increase in the tension of said resilient means as the plow is raised.

9. In a plow, a frame including a main beam, a supplemental beam pivotally connected to the main beam, a plow carried by the supplemental beam, a disk arranged in front of the plow, resilient means cooperatively connected between the frame and the supplemental beam for normally maintaining the plow and disk depressed, and means for reducing the increase in tension of the resilient means as the plow and disk rise upon encountering an obstruction.

10. In a plow, a frame including a main beam, a supplemental beam pivotally connected to the main beam, a plow secured to the supplemental beam, a disk rotatably mounted in advance of the plow, guiding means between the main beam and the supplemental beam, resilient means cooperatively connected between the frame and the supplemental beam for normally maintaining the plow and disk depressed, and means for reducing the increase in tension of the resilient means as the plow and disk rise upon encountering an obstruction.

11. In a plow, a frame including a main beam, a supplemental beam pivotally mounted on the main beam, a plow secured to the supplemental beam, a disk rotatably mounted in advance of the plow, guides secured to the main beam and engaging the supplemental beam, resilient means cooperatively connected between the frame and supplemental beam for normally maintaining the plow and disk depressed but yieldable to permit them to ride over an obstruction, and manually operable means for raising the disk and plow.

12. In a plow, a frame including a main beam, a supplemental beam pivotally mounted on the main beam, a plow secured to the supplemental beam, resilient means between the frame and the supplemental beam for normally maintaining the plow in the ground, means movable with the supplemental beam to lessen the resultant increase in tension of the resilient means when the plow rises upon meeting with an obstruction, and manually operable means connected with the supplemental beam for raising the plow and associated with the manually operable means to prevent any increase in the tension of the resilient means during the manual operation.

13. In a plow, a main beam, a supplemental beam pivotally mounted on the main beam, a pivoted slotted link mounted on the main beam, a manually operable lever, a plurality of connections between the manually operable lever and slotted link whereby the last-mentioned link is oscillated, a cross-head slidable in the slotted link, a link connecting the cross-head with the supplemental beam, an oscillating lever pivotally mounted on the main beam, another link connecting the cross-head with the oscillating lever, an arm mounted on the last-mentioned lever, a spring having a sliding connection at one end with said arm and having pivotal connection with the supplemetal beam for maintaining the plow in the ground and permitting a raising of the plow when said plow meets with an obstruction in the ground, and a link connecting the supplemental beam with the sliding connection of the spring.

14. In a plow, the combination with a main beam, of a supplemental beam pivoted to the main beam, implements for tilling the soil carried by the supplemental beam, a vertically disposed lever pivoted at the front of the main beam in advance of the pivotal connection of the supplemental beam, a manually operable lever at the rear end of the main beam, a connection between said lever and the vertically disposed lever, a pivoted link pivoted to the main beam, a connection between said link and the vertical lever, a link having a loose connection between the supplemental beam and the said pivoted link, a resilient means connected to the supplemental beam at one end, a connection between the supplemental beam and the upper end of the resilient means, and link connections between said pivoted link, the supplemental beam and the resilient means.

In testimony, that I claim the foregoing as my own, I have hereto affixed my signature.

ERNEST O. HUTSELL.